(No Model.)
G. GLASS.
SLAB GAGE OR INDICATOR FOR SAWMILL CARRIAGES.
No. 594,004. Patented Nov. 23, 1897.
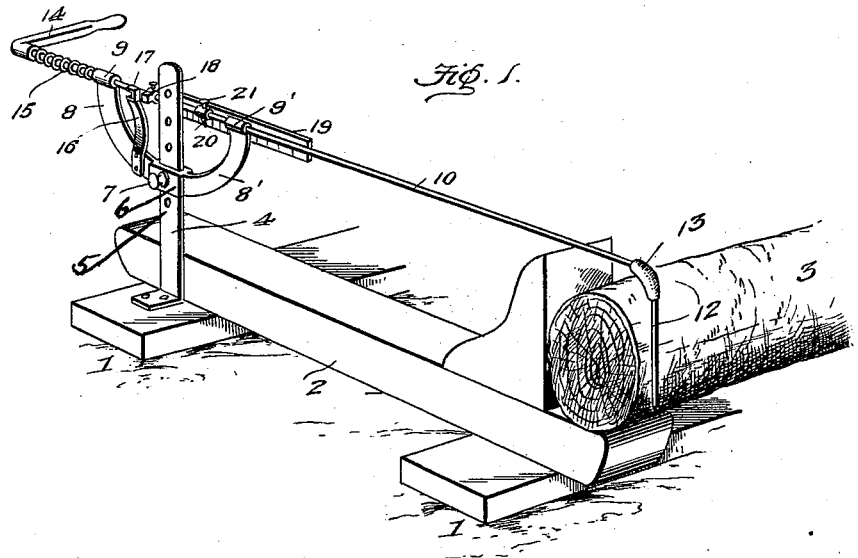
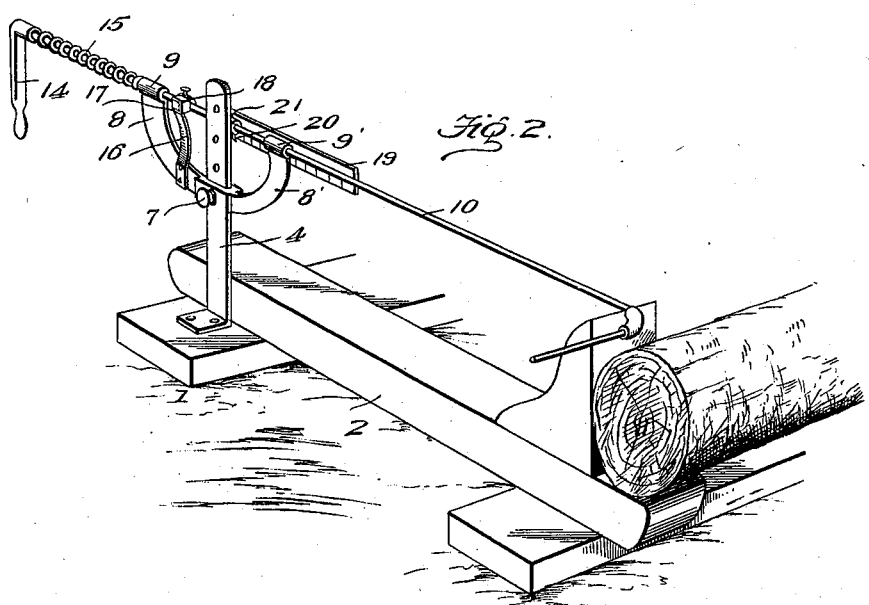
Witnesses
Inventor
George Glass
by H. B. Willson & Co.
Attorneys

UNITED STATES PATENT OFFICE.

GEORGE GLASS, OF PORT HURON, MICHIGAN.

SLAB GAGE OR INDICATOR FOR SAWMILL-CARRIAGES.

SPECIFICATION forming part of Letters Patent No. 594,004, dated November 23, 1897.

Application filed September 20, 1897. Serial No. 652,328. (No model.)

*To all whom it may concern:*

Be it known that I, GEORGE GLASS, a citizen of the United States, residing at Port Huron, in the county of St. Clair and State of Michigan, have invented certain new and useful Improvements in Slab Gages or Indicators for Sawmill-Carriages; and I do declare the following to be a full, clear, and exact description of the invention, such as will enable others skilled in the art to which it appertains to make and use the same.

My invention relates to certain new and useful improvements in that class of slab gages or indicators for sawmill-carriages for which an application for Letters Patent, Serial No. 646,245, was filed by me on the 28th day of July, 1897, and the object is to simplify the construction and improve the efficiency of the same.

To these ends the invention consists in the construction, combination, and general arrangement of the device, as will be hereinafter more fully described and specified in the claims.

In the accompanying drawings the same reference-characters indicate the same parts of the invention.

Figure 1 is a perspective view of my improved slab gage or indicator as it appears in use on a sawmill-carriage. Fig. 2 is a similar view showing the position of the gage or indicator when not in use.

1 represents the carriage-bed, 2 the head-block, and 3 the log.

4 represents a rectangular standard fixed to the carriage-bed, and it is provided with a series of transverse orifices 5 5, and 6 represents a cross-head which snugly encompasses said standard, so as to have a free vertical movement thereon, and it is provided with a spring-actuated pin 7, adapted to engage the orifices 5 and support said cross-head in the position to which it may be adjusted. This cross-head is formed with two upwardly-curved arms 8 8', terminating in horizontal alined sleeves 9 9', in which is journaled a transverse rod 10, the outer end of which terminates in a right-angular gage-arm 12, the angle of the junction being strengthened by a shoe 13. The inner end of this rod 10 is provided with a lever-handle 14, and 15 represents a spiral spring encompassing said rod between the handle 14 and the sleeve 9.

16 represents a spring-dog fixed to the cross-head arm 8, and its free arm is formed with parallel jaws 17 17, which engage the square collar 18, adjustably secured on the rod 10 to retain the same in the position shown in Fig. 2 as it appears when not in use.

19 represents a plate fixed to the curved arm 8', and its face is provided with a scale graduated in inches, and 20 represents a finger or pointer adjustably secured on the rod 10 by means of a thumb-screw 21, and this pointer is adapted to traverse said scale to indicate the position of the gage-arm 12.

Although I have specifically described the construction and relative arrangement of the several elements of my invention I do not desire to be confined to the same, as such changes or modifications may be made as clearly fall within the scope of my invention without departing from the spirit thereof.

Having thus fully described my invention, what I claim, and desire to secure by Letters Patent of the United States, is—

1. A slab indicator or gage for sawmill-carriages, comprising the carriage-bed, the standard 4 fixed thereon, the cross-head 6 vertically adjustable thereon, and provided with the arms 8 8', the cylindrical rod 10 longitudinally and axially adjustable in said arms and terminating at its outer end in the gage-arm 12, and means as described for indicating the point of longitudinal adjustment of said rod, substantially as shown and described.

2. A slab indicator or gage for sawmill-carriages, comprising the carriage-bed, the standard 4 provided with the transverse orifices 5 5, the cross-head 6, vertically adjustable on said standard and provided with the arms 8 8' terminating in the alined sleeves 9 9', the spring-actuated pin 7 mounted in said cross-head and adapted to engage said orifices in the standard, the rod 10 journaled in and longitudinally adjustable in said sleeves and having its outer end terminating in a right-angular gage-arm 12, the handle 14 fixed on the opposite end of said rod, the spiral spring 15 encompassing said rod between the handle and the sleeve 9, the fixed plate 19 provided with the graduated scale, and the pointer 20 adjustably mounted on said rod and adapted to traverse said scale, substantially as shown and described.

3. A slab-indicator for sawmill-carriages, comprising the carriage-bed, the standard 4 provided with the transverse orifices 5 5, the cross-head 6, vertically adjustable on said standard and provided with the arms 8 8' terminating in the alined sleeves 9 9', the spring-actuated pin 7 mounted in said cross-head and adapted to engage said orifices in the standard, the rod 10 journaled in and longitudinally adjustable in said sleeves and having its outer end terminating in a right-angular gage-arm 12, the handle 14 fixed on the opposite end of said rod, the spiral spring 15 encompassing said rod between the handle and the sleeve 9, the fixed plate 19 provided with the graduated scale, and the pointer 20 adjustably mounted on said rod, the square collar 18 adjustably mounted on said shaft, and the spring-dog 16 fixed to said cross-head and having its free end terminating in the square jaws 17 17 adapted to engage said collar, substantially as shown and described.

In testimony whereof I hereunto affix my signature in presence of two witnesses.

GEORGE GLASS.

Witnesses:
  E. S. POST,
  G. W. GILLESBY.